(12) United States Patent
Thomas et al.

(10) Patent No.: US 7,742,125 B2
(45) Date of Patent: Jun. 22, 2010

(54) LIGHT SWITCH HAVING PLURAL SHUTTERS

(75) Inventors: Alan C. Thomas, Gilbert, AZ (US); Walter J. Paciorek, Phoenix, AZ (US)

(73) Assignee: World Properties, Inc., Lincolnwood, IL (US)

( * ) Notice: Subject to any disclaimer, the term of this patent is extended or adjusted under 35 U.S.C. 154(b) by 118 days.

(21) Appl. No.: 11/895,537

(22) Filed: Aug. 24, 2007

(65) Prior Publication Data

US 2009/0051853 A1 Feb. 26, 2009

(51) Int. Cl.
*G02F 1/1333* (2006.01)
*G02B 26/02* (2006.01)

(52) U.S. Cl. .................. 349/86; 349/61; 349/84; 359/227

(58) Field of Classification Search .............. 349/86, 349/61, 68, 84, 62, 63, 56, 5, 7, 8, 12; 345/173, 345/36, 18.01; 359/227
See application file for complete search history.

(56) References Cited

U.S. PATENT DOCUMENTS

| 4,924,215 A | * | 5/1990 | Nelson ........................ 345/88 |
|---|---|---|---|
| 4,992,201 A | | 2/1991 | Pearlman ................... 252/299.1 |
| 4,994,204 A | * | 2/1991 | Doane et al. ............ 252/299.01 |
| 5,121,234 A | | 6/1992 | Kucera ......................... 359/50 |
| 5,993,689 A | * | 11/1999 | Kobayashi et al. ..... 252/299.01 |
| 6,275,219 B1 | * | 8/2001 | Isenman ...................... 345/173 |
| 6,441,551 B1 | | 8/2002 | Abe et al. .................... 313/503 |
| 6,842,170 B1 | * | 1/2005 | Akins et al. ................. 345/173 |
| 2008/0143689 A1 | * | 6/2008 | Foo et al. .................... 345/174 |
| 2009/0051853 A1 | * | 2/2009 | Thomas et al. ................ 349/86 |

FOREIGN PATENT DOCUMENTS

WO    WO 2005 121878    12/2005

OTHER PUBLICATIONS

U.S. Appl. No. 06/254,894, filed Nov. 2006, Jung et al.

* cited by examiner

*Primary Examiner*—Brian M Healy
(74) *Attorney, Agent, or Firm*—Paul F. Wille

(57) ABSTRACT

A display includes a light switch overlying a backlight and having at least two light shutters which do not, by themselves, convey information by the shape thereof. The lit area of the backlight is equal to or greater than the sum of the areas of the shutters within the area. The display can also include a graphics layer overlying the light switch. The information content of the display is changed by changing the graphics layer.

6 Claims, 5 Drawing Sheets

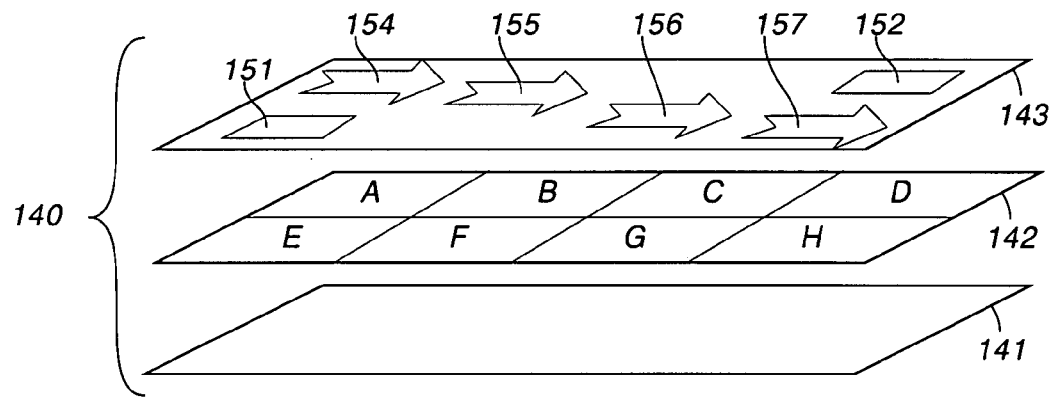
F I G. 13
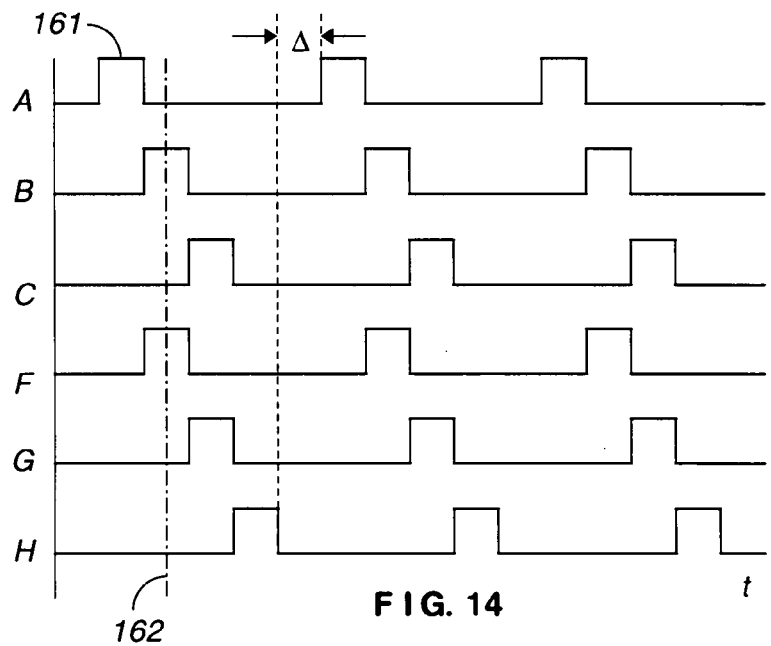
F I G. 14
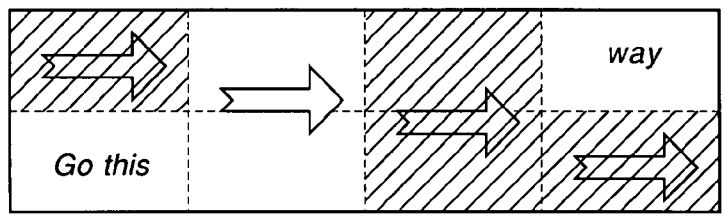
F I G. 15

LIGHT SWITCH HAVING PLURAL SHUTTERS

FIELD OF THE INVENTION

This invention relates to displays and, in particular, to a display having a plurality of light shutters, each of which is a substantial fraction of the total display and which, in themselves, do not display information but improve the intelligibility of the information that is displayed.

GLOSSARY

As used herein, a "display" is a device that provides information in visual form to a viewer.

A "graphic" can be text, a symbol, an arbitrary shape, or some combination thereof. A graphic can be translucent, diffuse, shaded, colored, a silhouette or outline, or some combination thereof. Graphics can be positive (black on white) or negative (white on black), where white is diffuse, shaded, etc.

A "pixel" is a picture element within a single boundary.

An "EL lamp" is a thick film, capacitive device including a layer containing electroluminescent phosphor between two electrodes. The phosphor is luminous when a voltage is applied to the electrodes.

A "thick film" EL lamp refers to one type of EL lamp and "thin film" EL lamp refers to a different type of EL lamp. The terms only broadly relate to actual thickness and actually identify distinct disciplines. A thin, thick film EL lamp is not a contradiction in terms and such a lamp is considerably thicker than a thin film EL lamp.

"Opaque" does not mean that no light is transmitted, only that the amount of light transmitted is substantially reduced, e.g. to ten percent of incident light.

A "phosphor" is not restricted to a single type of phosphor or dopant and does not exclude cascading phosphors or dyes for color enhancement.

"Overlying" or "underlying" do not imply orientation and merely describe a situation wherein layers of materials have major surfaces facing each other, with or without contact. The surfaces are not necessarily planar.

BACKGROUND OF THE INVENTION

There are many technologies that have been used for displaying information. One type, liquid crystal, was limited initially to seven segments for displaying numerals, with relatively large segments. As the technology improved, not only could more information be crammed into the same area as before, color became available as well. To avoid plainness, icons were designed to convey information in the name of simplicity, universality, and cuteness. The result is that a modern display can be a forest of data, some symbolic, some literal, to which the user must acclimate, largely by ignoring some of it.

It has been found that some data is more intelligible when represented graphically, e.g. an analog clock or a bar graph, rather than digitally as a plurality of numbers. The amount of information contained in such graphic displays is relatively small, referred to herein as "low content" information, but is easily and rapidly understood.

In some displays, change is used to attract attention. The change can be the apparent motion of a graphic or blinking a graphic on and off. For some liquid crystal displays, the off state may not be truly black, particularly those displays with reflection of ambient light for back lighting. Turning on a mask when the underlying graphic is off can improve apparent contrast.

In the last twenty years, a particular class of materials, known as polymer dispersed liquid crystals, has been developed for displays; e.g., see U.S. Pat. No. 4,992,201 (Pearlman). Devices using these materials operate at 60-120 volts peak-to-peak, unlike earlier liquid crystal materials that operated at much lower voltages, and provide contrast without the need for polarizers. Sometimes referred to as "optical shutters," polymer dispersed liquid crystals have applications outside the realm of displays.

U.S. Pat. No. 6,842,170 (Akins et al.) discloses a liquid crystal display combined with an electroluminescent (EL) backlight and a touchscreen. The liquid crystal display is part of a keypad, containing a mask layer with images of the buttons on a telephone (0-9, * and #) and other control buttons. It is also disclosed that the liquid crystal display and the EL backlight can share a common substrate.

International Publication WO 2005/121878 discloses a liquid crystal display and an EL backlight on the same side of a substrate. Other permutations are known in the art, with devices on opposite sides of a substrate; e.g., see U.S. Pat. No. 5,121,234 (Kucera) and U.S. Pat. No. 6,441,551 (Abe et al.). Various interlayers or outer layers for affecting optical performance, e.g. color, reflectance, and dispersion, are also known in the art.

EL devices are not the only devices suitable for backlighting liquid crystal displays. Light guides coupled to various light sources are known in the art; e.g. Published application 2006/0254894 (Jung et al.) discloses a light guide edge lit by a light emitting diode and having features in the light guide for scattering light out of the plane of the light guide. A difficulty with the light guide is the inability to change output once the backlight is constructed. For example, a light guide can provide reasonably uniform lighting over an area or use features to illuminate selective areas. In either case, the result is fixed and change is costly.

The choice of a technology for a particular display is a balance of competing interests, not the least of which is cost. In the case of cellular telephones, the choice is often based on the presumption that the user will be indoors or at least not in direct sunlight when the telephone is used. In other words, the content of the display all but vanishes in bright light because the display relies on luminous backlighting for visibility. Many liquid crystal displays rely on reflective backlighting. Thus, the backlighting increases or decreases with ambient light and the content of the display remains visible. Some displays try for the best of both worlds with a "transflective" layer between a backlight and a liquid crystal module.

Although the content of a display may vary, some of the information can be of immediate and continuing interest to a user, e.g. battery life. Thus, it is desirable for some information to be continuously visible, regardless of ambient light level. It is also desirable for a display to make important information conspicuous. Further, it is desirable to have a display that is readily changeable at low cost.

In view of the foregoing, it is therefore an object of the invention to simplify the content of a display by obscuring some information during at least one mode of operation and showing the information during at least one other mode of operation.

Another object of the invention is to provide a display of low content information that can be located optimally in a system and be obscured or legible, as desired.

A further object of the invention is to provide a backlight that provides selective lighting even when using a light guide.

Another object of the invention is to provide selective control of reflectance from an EL backlight.

A further object of the invention is to provide a display that can be easily changed at low cost.

Another object of the invention is to provide a light switch having plural shutters that enable a display to simulate animation or motion.

SUMMARY OF THE INVENTION

The foregoing objects are achieved by the invention in which a display includes a light switch overlying a backlight and having at least two light shutters which do not, by themselves, convey information by the shape thereof. The lit area of the backlight is equal to or greater than the sum of the areas of the shutters within the area. The display can also include a graphics layer overlying the light switch. The information content of the display is changed by changing the graphics layer.

BRIEF DESCRIPTION OF THE DRAWINGS

A more complete understanding of the invention can be obtained by considering the following detailed description in conjunction with the accompanying drawings, in which:

FIG. 13 is an expanded view of a display constructed in accordance with the invention;

FIG. 14 is a timing diagram illustrating the operation of the embodiment of FIG. 13; and FIG. 15 is a plan view showing one state of the display illustrated in FIG. 13.

DETAILED DESCRIPTION OF THE INVENTION

Figure 1:
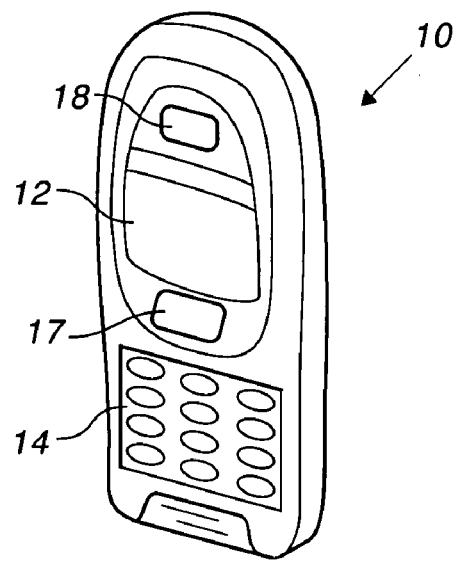
FIG. 1 is a perspective view of a cellular telephone having backlit areas constructed in accordance with the invention.

FIG. 1 is a perspective view of a cellular telephone, meant to also represent any personal electronic device that does not open or unfold in some way. Telephone 10 includes display 12 where the information typically associated with telephones is displayed. In addition, and not part of display 12 or keypad 14, are backlit areas 17 and 18. These displays can be used for low content information, such as signal strength, battery life, or roaming. The number of backlit areas is a matter of design, depending, in part, on the nature of the particular portable electronic device.

Figure 2:
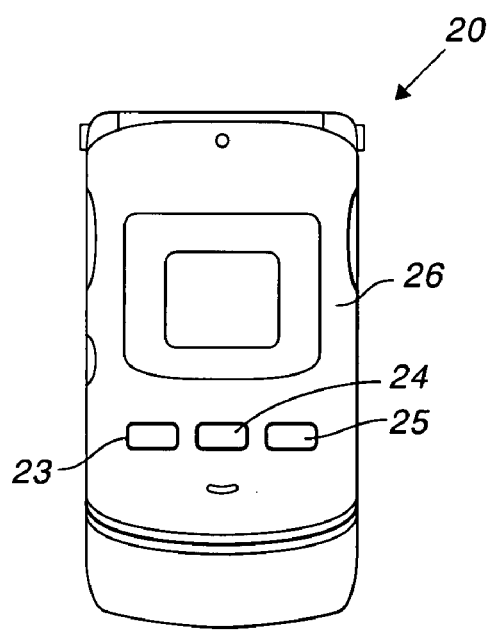
FIG. 2 is a front view of a folding cellular telephone having backlit areas constructed in accordance with the invention.

FIG. 2 is a front view of a folding cellular telephone incorporating backlit areas constructed in accordance with the invention and represents any portable electronic device having a folding structure. Telephone 20 includes backlit areas 23, 24, and 25 formed on, in or under shell 26. As with the embodiment of FIG. 1, these displays can be used for low content information.

Figure 3:
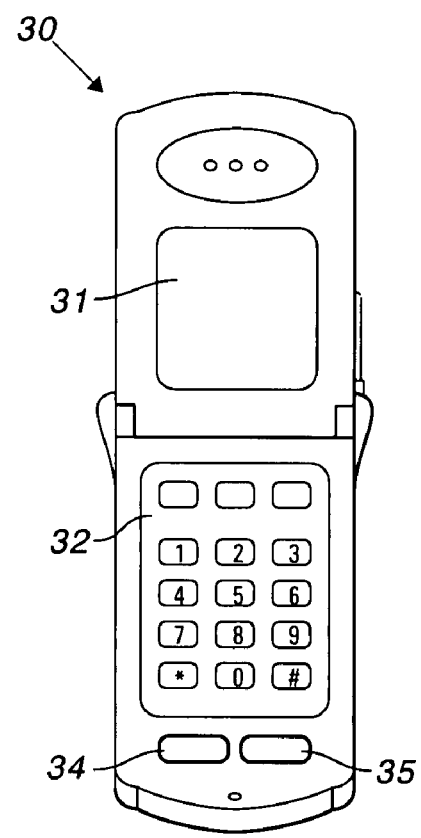
FIG. 3 is a front view of an unfolded cellular telephone incorporating backlit areas constructed in accordance with the invention.

FIG. 3 is a front view of an unfolded cellular telephone incorporating backlit areas constructed in accordance with the invention and represents any portable electronic device that unfolds for operation. Telephone 30 includes display 31 and keypad 32. Telephone 30 also includes backlit areas 34 and 35.

Figure 4:
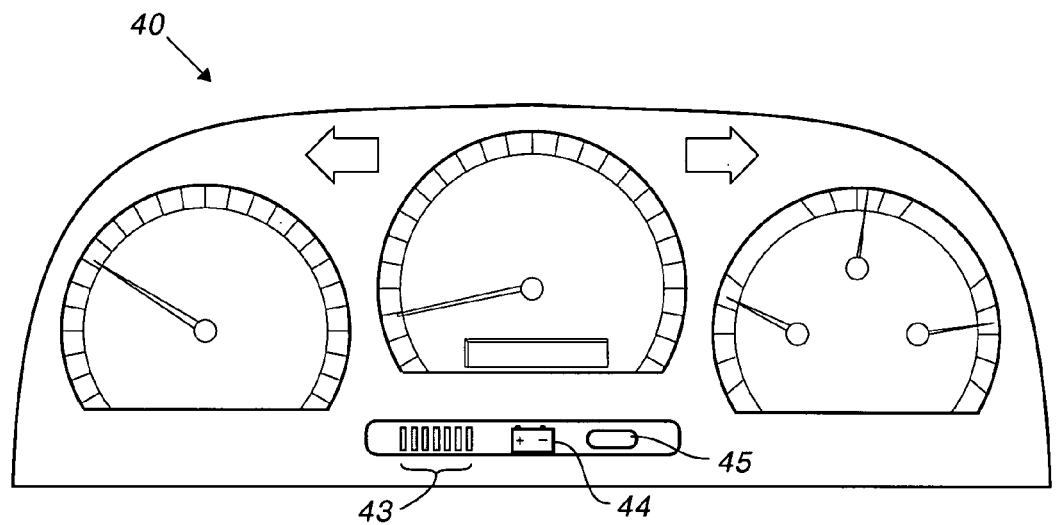
FIG. 4 is a plan view of an instrument panel incorporating backlit areas constructed in accordance with the invention.

FIG. 4 is a plan view of an instrument panel incorporating backlit areas constructed in accordance with the invention. The instrument panel could be used in any type of vehicle such as automobile, aircraft, motorcycle, or heavy equipment. Instrument panel 40 includes gauges and displays appropriate for the particular application. In accordance with the invention, instrument panel 40 includes backlit areas 43, 44, and 45. These displays provide low content information, such as heading, operating hours, battery condition, or status of a safety device.

Figure 5:
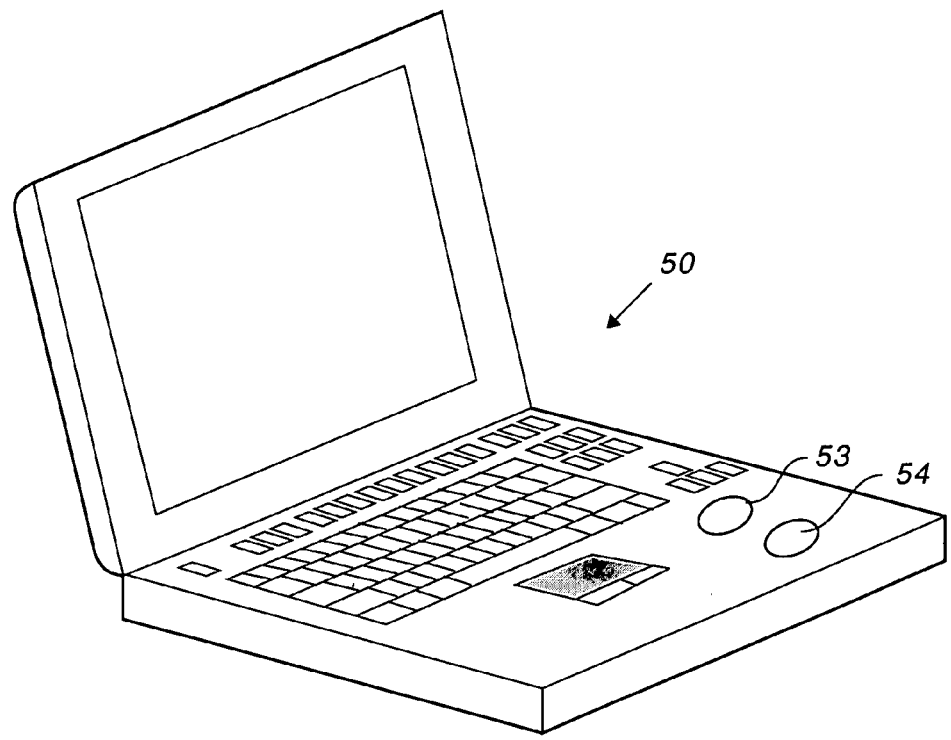
FIG. 5 is a perspective view of a portable computer incorporating backlit areas constructed in accordance with the invention.

FIG. 5 is a perspective view of a portable computer incorporating backlit areas constructed in accordance with the invention. Computer 50 includes backlit areas 53 and 54. These displays provide low content information, such as detecting a wireless network or battery condition. One or more backlit areas could be located on the outside of computer 50, as in the embodiment of FIG. 2.

Figure 6:
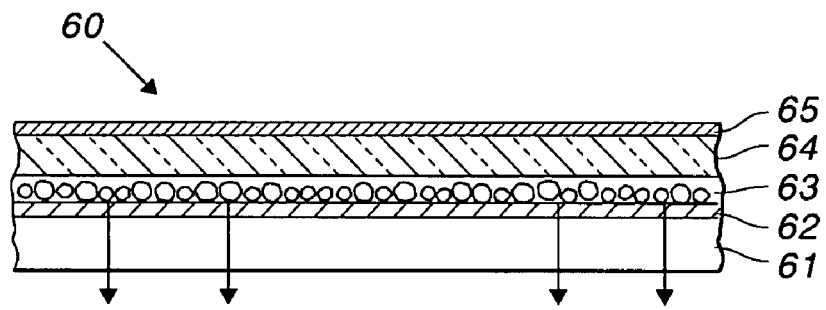
FIG. 6 is a cross-section of a thick film, electroluminescent lamp constructed as known in the art.

FIG. 6 is a cross-section of a thick film, electroluminescent lamp constructed as known in the art. None of the drawings is drawn to scale, within a drawing or from figure to figure. Some layers, such as indium tin oxide, are quite thin, on the order of angstroms. Other layers are quite thick, such as substrate 61, on the order of mils (0.025 mm).

In FIG. 6, transparent front electrode 62 overlies transparent substrate 61 and is a thin layer of indium tin oxide (ITO) or indium oxide. Phosphor layer 63 overlies the front electrode and dielectric layer 64 overlies the phosphor layer. Layers 63 and 64 are combined in some applications. Overlying dielectric layer 64 is opaque rear electrode 65. An optional backing layer (not shown) may also be provided, e.g. for insulating the rear electrode. Coated phosphor particles are used, eliminating the need for a sealing layer.

The phosphor layer, or an additional layer, may contain additives for color correction, to assure that the color of the light reflected when the lamp is off is close to the color of the light emitted by the lamp when turned on. Light is emitted through transparent substrate 61. Electrode 62 or electrode 65, or both, can be patterned, dividing the backlight 60 into a plurality of EL lamps, collectively referred to as an EL panel.

The phosphor and dielectric layers can be interchanged, in which case rear electrode 65 must be transparent. For this construction, light is emitted through the rear electrode.

Figure 7:
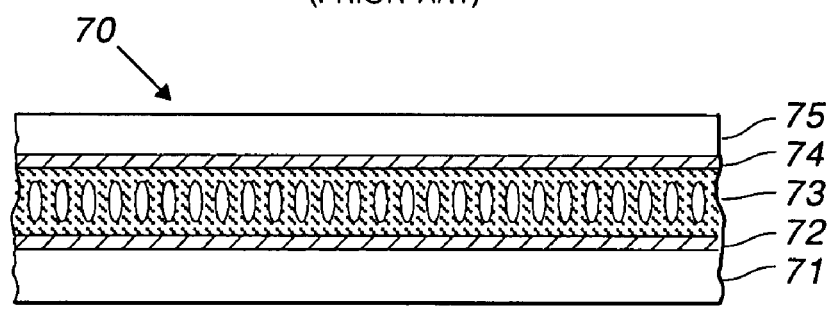
FIG. 7 is a cross-section of a polymer dispersed liquid crystal display constructed as known in the art.

FIG. 7 is a cross-section of a polymer dispersed liquid crystal module constructed as known in the art. Module 70 includes substrate 71 having a transparent conductive layer, such as ITO, overlying a major surface. PDLC material overlies electrode 73 and transparent electrode 74 overlies the PDLC material. Layer 75 is an insulating or protective layer.

If one or both of the transparent electrodes is suitably patterned, the module displays the information represented by the pattern.

In portable electronic devices, an EL lamp is powered by a driver that converts low voltage direct current from a battery into high voltage alternating current. In order for an EL lamp to glow sufficiently, a peak-to-peak voltage in excess of about one hundred volts is necessary. This is the same voltage necessary for operating a PDLC display. This enables one to use the same driver for both devices, simplifying construction and lowering costs.

Figure 8:
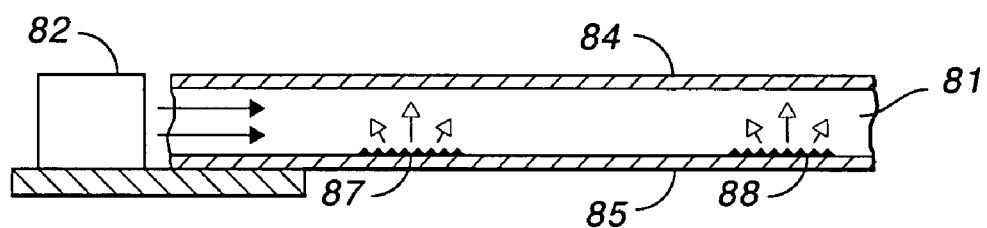
FIG. 8 is a cross-section of a back light in the form of a light guide edge lit by a suitable light source.

FIG. 8 is a cross-sectional view of a back light constructed as known in the art. Light guide 81 is a transparent sheet, e.g. of polycarbonate. Light source 82, e.g., one or more light emitting diodes, emits light into the edge of guide 81, which conducts the light transversely, as illustrated in FIG. 8, substantially by internal reflection. Optional cladding layers 84 and 85 are provided to enhance total internal reflection. Features 87 and 88 at one major surface of light guide 81 upset the total internal reflection, causing light to be emitted from the opposite major surface. Several different kinds of light sources are known in the art.

Figure 9:
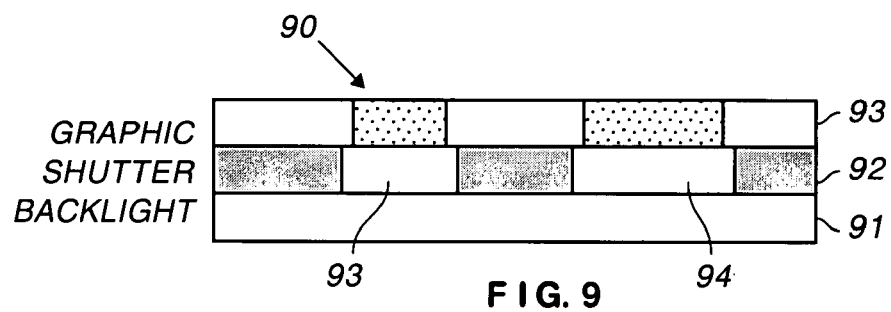
FIG. 9 is a cross-section of a display including a light switch having plural shutters and constructed in accordance with a preferred embodiment of the invention.

FIG. 9 is a cross-section of a display including a light switch having plural shutters and constructed in accordance with a preferred embodiment of the invention. Light switch 90 includes backlight 91, which can be an EL lamp as illustrated in FIG. 6 or a light guide as illustrated in FIG. 8. If an EL lamp constructed as illustrated in FIG. 6 is used, the lamp is flipped vertically to cause light to be emitted upwardly through PDLC layer 92.

Figure 12:
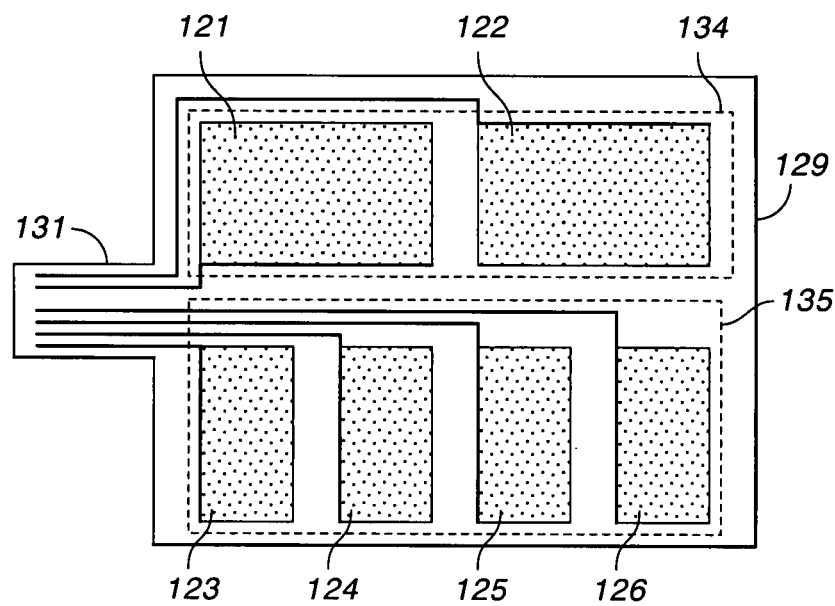
FIG. 12 is a plan view of the light shutter illustrated in FIG. 9.

Light switch 92 includes a plurality of active areas or shutters, such as shutter 93 and shutter 94. These are areas between electrodes. One electrode can substantially completely cover backlight 91. The opposed electrode is patterned, e.g. as illustrated in FIG. 12, thereby defining the active areas.

Figure 10:
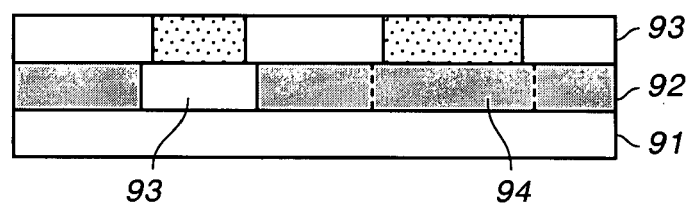
FIG. 10 illustrates the operation of the display illustrated in FIG. 9.

Overlying layer 92 is graphic layer 95. This layer includes a plurality of graphics that are to be selectively illuminated. Layer 92 does not contain information. Layer 92 significantly reduces light from backlight 91 in the off or opaque state, whether backlight 91 is luminous or reflective. As illustrated in FIG. 10, shutter 93 is on or transmissive while shutter 94 is off or opaque.

Although graphics are illustrated as extending through the thickness of the graphics layer, this is for clarity only. The graphics can be on either major surface of layer 92 or contained within the thickness of the layer, depending upon the nature of the graphics.

Figure 11:
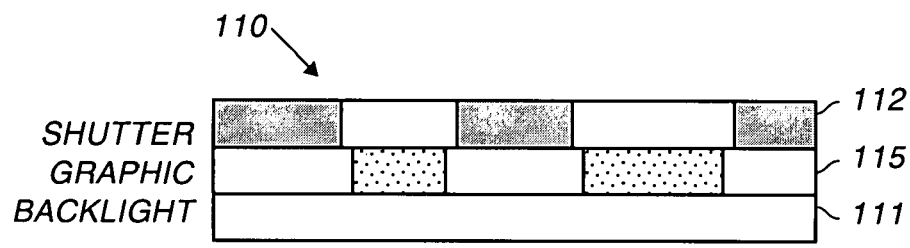
FIG. 11 is a cross-section of a display including a light switch constructed in accordance with an alternative embodiment of the invention.

FIG. 11 is a cross-section of a display including a light switch having plural shutters and constructed in accordance with an alternative embodiment of the invention. Compared with the embodiment of FIG. 9, the order of the layers is changed, with graphic layer 112 between backlight 111 and PDLC layer 115. The operation of light switch 110 is the same as the operation of light switch 90. One could use graphic layer 112 as a substrate for the other two layers.

FIG. 12 is a plan view of a light switch having a plurality of shutters in accordance with the invention. Each of electrodes 121, 122, 123, 224, 125, and 126 is coupled to connector area 131 by its own bus bar and defines an active area of a shutter. Lit areas 134 and 135 are also coupled to connector area 131 by bus bars (not shown).

The electrodes are transparent and located on transparent sheet 129. Electrodes 121 and 122 are within lit area 134. Electrodes 123, 224, 125, and 126 are within lit area 135. The sum of the areas of electrodes 121 and 122 is equal to or less than the area of lit area 134. The sum of the areas of electrodes 123, 224, 125, and 126 is equal to or less than the area of lit area 135.

Each shutter can be, but need not be, operated independently of the other. Each lit area can be, but need not be, operated independently of the other. As also illustrated in FIG. 12, each bus bar preferably extends along a long edge of an electrode to reduce voltage drop.

FIG. 13 illustrates an example of a display that is constructed in accordance with the invention and simulates motion. Display 140 includes backlight 141, e.g., an EL lamp, a plurality of shutters 142, and graphics layer 143. The graphics layer includes text areas 151 and 153 and symbols 154, 155, 156, and 157. The graphics can be positive or negative or a mixture of positive and negative. Shutter layer 142 includes shutters labeled A through H. The shutters are operable independently of each other.

FIG. 14 is a chart illustrating the operation of the shutters. Shutters D and E are omitted from the chart because they are "on" or "open" anytime the backlight is "on." Shutters D and E permit backlight 141 to shine through text areas 151 and 152. In FIG. 14, a shutter is "on" or "open" when the line representing the shutter is raised, as indicated by arrow 161. As illustrated in FIG. 14, shutter A opens first, then shutters B and F, then shutters C and G, then shutter H.

As illustrated in FIG. 14 there is no overlap between the sequences of shutter openings. For example, shutter A closes as shutter B opens. There could be overlap, depending upon the optical effect one is trying to create. There is a gap or delay, Δ, between shutter H closing and the cycle beginning with shutter A opening. The delay can be zero or as many seconds as one wishes, again depending upon the optical effect one is trying to create.

FIG. 15 illustrates the state of display 140 at the time indicated by line 162 in FIG. 14. The dashed lines are not part of the display but are included for reference.

The invention thus simplifies the content of a display by obscuring or revealing information at predetermined times. Display of low content information can be located optimally in a system and be obscured or legible, as desired. The invention provides selective lighting even when using a light guide and provides selective control of reflectance from an EL backlight. By not patterning the EL backlight, one can reduce costs even more. Graphics are easily and quickly changed by simply changing the graphics layer.

Having thus described the invention, it will be apparent to those of skill in the art that various modifications can be made within the scope of the invention. For example, additional layers, color filters, coatings, screen printings, additional graphics, and the like can be added to any layer, or between the layers, to affect the optical properties of the light switch. In some applications, the graphics layer can be omitted; in which case, one or more shutters can provide a decorative effect. Although PDLC is preferred for the light switch, electrochromic materials can be used instead. Similarly, sputtered ITO is preferred as the transparent conductor but other materials can be used instead; such as, PEDOT:PSS, nanoparticle ITO, or acicular ITO. The substrate material is preferably PET but polycarbonate or urethane can be used instead, among other materials.

What is claimed is:

1. A display comprising:
   a backlight having a lit area;
   a light switch overlying the backlight and having at least two light shutters which do not, by themselves, convey information by the shape thereof;

wherein the lit area of the backlight is greater than the sum of the areas of the shutters that are within the lit area.

2. A display as set forth in claim 1 and further including:
a graphics layer overlying the light switch.

3. A display as set forth in claim 2 wherein the graphics layer includes information selectively displayed by operation of said light shutters.

4. A display as set forth in claim 2 wherein said graphics layer is located between the backlight and the light switch.

5. A display as set forth in claim 2 wherein said graphics layer is located on a side of the light switch opposite the backlight.

6. A display as set forth in claim 1 wherein the light shutters include PDLC.

* * * * *